United States Patent [19]

Lapornik

[11] 4,139,305
[45] Feb. 13, 1979

[54] APPARATUS AND METHOD FOR MEASURING THE VERTEX POWER OF AN OPTICAL SYSTEM

[75] Inventor: Edward F. Lapornik, Washington, D.C.

[73] Assignee: Acuity Systems, Incorporated, South Reston, Va.

[21] Appl. No.: 782,296

[22] Filed: Mar. 28, 1977

[51] Int. Cl.² ............................................... G01B 9/00
[52] U.S. Cl. ..................................... 356/125; 356/127
[58] Field of Search ............... 356/124, 125, 126, 127, 356/128

[56] References Cited

U.S. PATENT DOCUMENTS

| | | | |
|---|---|---|---|
| 3,832,066 | 8/1974 | Cornsweet | 356/125 |
| 3,880,525 | 4/1975 | Johnson | 356/127 |
| 4,007,990 | 2/1977 | McDevitt et al. | 356/124 |

*Primary Examiner*—John K. Corbin
*Assistant Examiner*—R. A. Rosenberger

*Attorney, Agent, or Firm*—Cushman, Darby & Cushman

[57] ABSTRACT

Apparatus for measuring the refractive properties of a sphero-cylindrical lens system of the type utilizing an incident light beam scanned in at a predetermined radius about the central axis of the lens system to provide a refracted beam. A generally opaque mask having an annular transparent portion is positioned in the path of the refracted beam, to eliminate errors caused by deviations in radial height from the scanning radius of the refracted beam as it exits the lens system due to refraction within the interior of the optical system. A position-sensitive photodetector generates a signal indicative of the instantaneous position in a given plane due to refraction of the portions of the light beam passing through the mask. The photodetector output signal is then processed to provide an indication of the refractive properties. Various embodiments of the mask are also disclosed. Also permutations of the above including pinhole aperture, input light and other detection means is discussed.

11 Claims, 5 Drawing Figures

4,139,305

APPARATUS AND METHOD FOR MEASURING THE VERTEX POWER OF AN OPTICAL SYSTEM

CROSS REFERENCE TO RELATED DISCLOSURES

Of interest is copending application Ser. No. 782,297, now U.S. Pat. No. 4,102,575, entitled "Back Vertex Annular Aperture", filed on or about even data herewith, by E. F. Lapornik and Douglas D. Rife, commonly assigned with the present invention to Acuity Systems, Incorporated, Reston, Va.

The present invention is related to apparatus for measuring refractive properties of lens systems and, in particular, for measuring the back vertex power of a sphero-cylindrical lens system. An example of a sphero-cylindrical lens system is a spectacle lens. Such an apparatus is often referred to as a lensmeter.

A sphero-cylindrical lens system is, in effect, a combination of spherical lenses and cylindrical lenses. Sphero-cylindrical lens systems are generally described in terms of the following parameters: spherical power, cylindrical power, cylindrical axis, prism power and prism axis. The spherical power of the lens system is defined as the reciprocal of the spherical focal length in meters and is generally expressed in dioptors. The cylinder power of a lens is the difference of the orthogonal major and minor powers of a cylindrical lens. The cylindrical axis is the angular orientation, generally expressed in degrees, of the major or minor power meridian in the lens system.

For a description of various apparatus and methods for analyzing or measuring refractive properties of sphero-cylindrical lens systems, reference is made to U.S. Pat. Nos. 3,832,066 and 3,870,415, issued to T. Cornsweet on Aug. 27, 1974 and Mar. 11, 1975, respectively, commonly assigned with the present invention, and U.S. Pat. No. 3,877,788 issued Apr. 15, 1976 to R. Sprague et al.

A technically and economically feasible apparatus for providing an objective readout of one or more of the above-named lens system parameters is described in U.S. Pat. No. 4,007,990 issued Feb. 15, 1977 to H. I. McDevitt, Jr. et al. The McDevitt, Jr. et al apparatus is commonly assigned with the present invention. Briefly, in the McDevitt, Jr. et al apparatus, an incident light beam of parallel rays scans a circular locus at a known radius from the axis of a lens system under test. The resulting refracted beam passing from the lens system is directed onto a position-sensitive photodetector disposed in a subsequent plane. The electrical output of the photodetector is processed to provide a measurement of the lens system's sphero-cylindrical parameters.

As will be more fully explained, an underlying assumption in the operation of such McDevitt, Jr. et al apparatus is that the scanned light beam passes through both the front and back vertex planes of the lens system at the same known radius from the lens system axis. While such an assumption is practically accurate for very thin lenses, it becomes increasingly inaccurate for thicker lenses. As will be appreciated, the incident beam (parallel to the axis) is refracted away from its initial radial position during its passage through the lens itself. Therefore, the radial position of the refracted beam upon exiting the lens is necessarily different from the known incident radial position by an amount which is a function of the lens front surface power, thickness, lens material index, etc. This difference gives rise to an inherent error in the McDevitt, Jr. et al apparatus.

Now, however, it has been discovered that such error can be substantially eliminated by placing a mask having an aperture of known radial dimensions in the immediate path of the refracted beam passing from the lens. Since the radial position of the aperture is known and fixed, all but those rays of the refracted beam which happen to pass through a slit of known radial position are masked from the detector. Such knowledge of the fixed radial position of the refracted beam provides the McDevitt, Jr. et al apparatus with substantially error-free output vis-a-vis measurement errors otherwise produced with thicker lenses.

A description of a preferred embodiment follows with reference to the accompanying drawings wherein like numerals denote like elements and:

Figure 1:
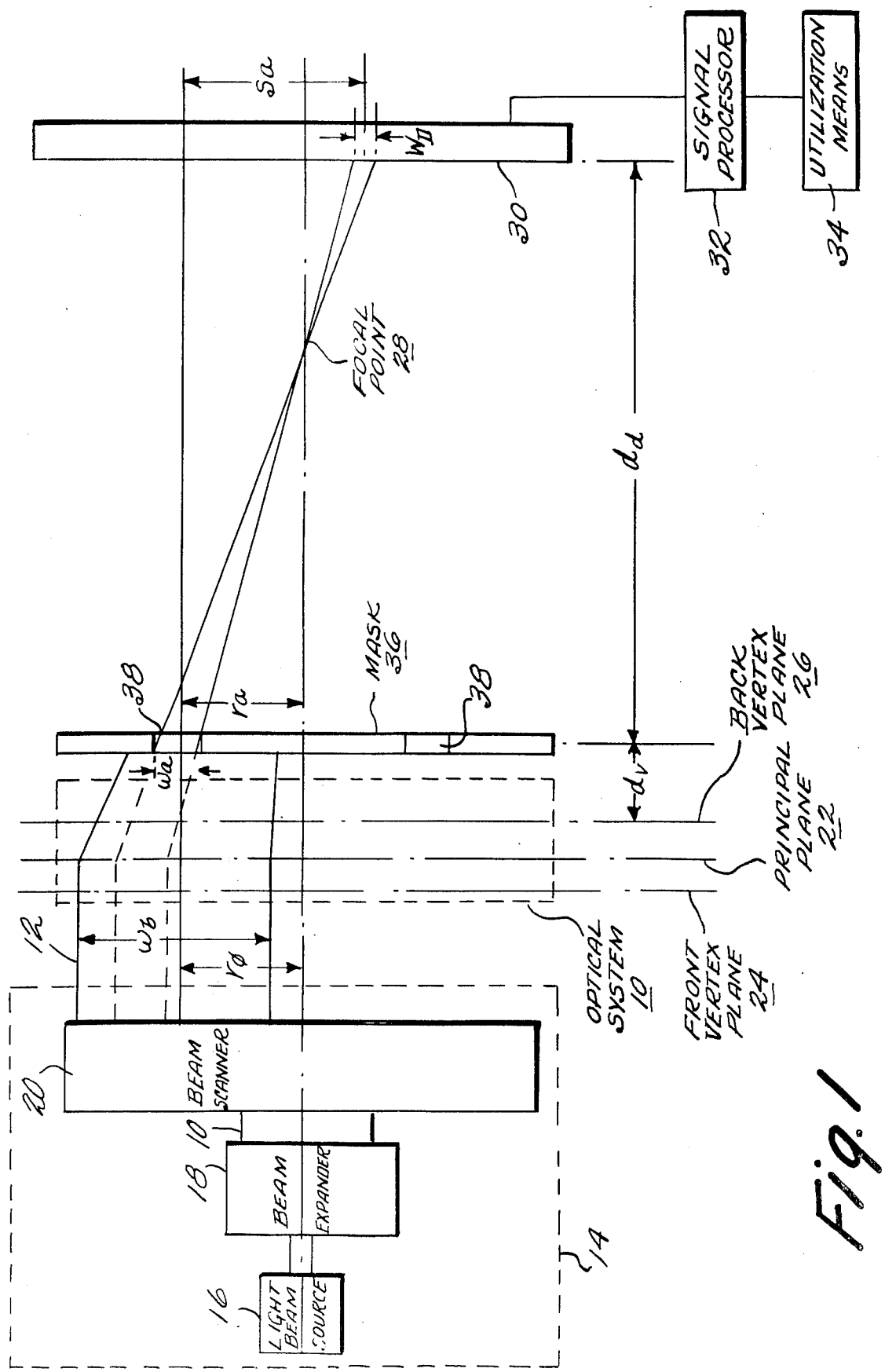
FIG. 1 is a block schematic of an apparatus for measuring the refractive properties of an optical system in accordance with the present invention.

With reference to FIG. 1, a lens system 10 is, as in the McDevitt, Jr. et al apparatus, placed in the path of a light beam 12 of a predetermined radial width ($W_d$). Beam 12 is provided by means generally indicated as 14. Lens system 10 is represented by a rear principal plane 22, front and back vertex planes 24 and 26, respectively, and has a back focal point 28. Beam 12 rotationally scans at a predetermined centroidal radius $r_o$, about the optical axis of lens system 10 to, in effect, describe a circular locus or ring on rear principal plane 22. Beam 12 is refracted by lens system 10 such that, in effect, each ray of the beam tends to pass in a straight line from its intersection with principal plane 22 through focal point 28 to describe a circular or approximately elliptical locus on a subsequent parallel plane located at a predetermined axial position from system 10. A linear position-sensitive photodetector 30, rotating in synchronism with the scanning beam 12, is utilized to measure the parameters of the locus, providing on a meridional basis, a signal indicative of the instantaneous point of intersection of the refracted beam rays with the subsequent plane. Output signals from photodetector 30 are applied to a suitable signal processor 32 which, in effect, separates the various frequency components of the photodetector output signal to develop signals indicative of the various optical parameters of system 10. The parameter signals are applied to suitable utilization means 34, such as a display. For a more detailed description of photodetector 30, signal processor 32 and utilization means 34, reference is made to the aforementioned U.S. Pat. No. 4,007,990 to McDevitt, Jr. et al.

Figure 2:
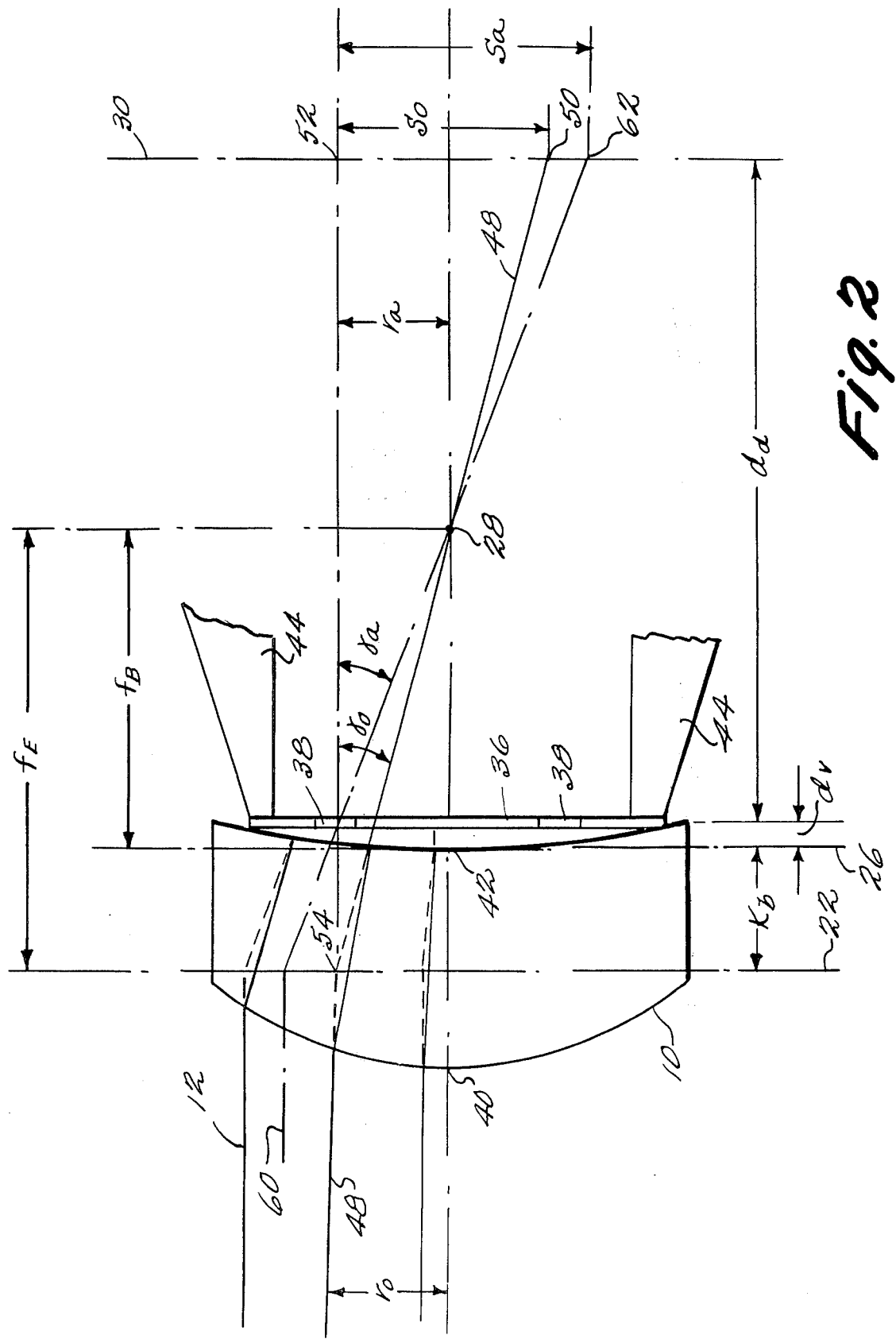
FIG. 2 is a schematic diagram of a meridian section of a portion of such apparatus.

Before proceeding with an explanation of how the back vertex power is measured by the present invention, a more detailed explanation of the derivation of effective focal length ($f_E$) by the aforementioned McDevitt, Jr. et al apparatus is given to facilitate an understanding of the present invention. With reference now to FIG. 2, lens system 10 is shown in the form of a sphero-cylindrical lens having a rear principal plane 22 and front and back surfaces 40 and 42, surface 42 having a vertex in plane 26. Lens 10 is supported in the path of beam 12 by a lens support cone 44, such that the lens axis is centered on the rotational scanning axis. Support cone 44, in the present invention, preferably includes a mask 36 as will be explained. For the moment, mask 36 is assumed to be absent. With attention directed to a given meridian of lens 10, a centroidal ray 48, parallel to the rotational axis of beam 12 at the scanning radius $r_o$ from the rotational (and lens) axis impinges upon lens 10. Ray 48 is, therefore, refracted such that, in effect, it passes from principal plane 22 in a straight line through focal point 28 to a point 50 on the plane of detector 30. Ray 48 is thus displaced by distance, $s_o$, from the point 52 where it would have intersected the plane of detector 30 had it not been refracted.

Lens 10 refracts ray 48 by an angle $\delta_0$ having a tangent in accordance with the following equation:

$$\tan \gamma_0 = s_o/(d_d + d_v + k_b) \tag{1}$$

where $d_d$ is the known distance between detector 30 and support cone 44, $d_v$ is the distance between support cone 44 and vertex 42 and $k_b$ is the distance from rear vertex 42 to the rear principal plane 22. It should be noted that a similar angle is formed between ray 48 as refracted and the central axis of the system. Thus, the tangent of the refraction angle is also equal to the scanning radius $r_o$ over the effective focal length $f_E$ of the lens in the instantaneous meridian scanned. Equating the two expressions for the tangent of the refraction angle, the effective power of the lens ($F_E$), that is, the reciprocal of the effective focal length ($f_E$), may be expressed in terms of $s_o$. More specifically:

$$F_E = s_o/r_o (d_d + d_v + k_b) \tag{2}$$

Suitable means, such as photodetector 30, provides an indication of the deviation $s_o$ and, therefore, the effective lens power $F_E$ or back vertex power $F_B$. Thus, the deviation "$s_o$" measured by detector 30, when normalized to ray scan radius $r_o$ and detector to lens rear principal plane distance, is representative of the effective spherical power of the lens in the particular meridian. Where lens 10 is slightly decentered, the average value of the respective powers measured in opposite meridians is indicative of the true lens power in those meridians and the differences between the powers in a given meridian and the opposite meridian represents the lens decentering or prismatic value in that meridian. Thus, where beam 12 rotationally scans lens 10, a position-sensitive photodetector 30, disposed in the subsequent plane and rotated in synchronization with the light beam, produces an electrical output signal representative of the instantaneous deviation of the refracted light beam from the position of a non-refracted beam. As explained in the aforementioned U.S. Pat. No. 4,007,990 to McDevitt, Jr. et al, the output signal of the photodetector comprises separable frequency components representative of the respective parameters; a DC component representative of the average spherical power, a component at the scanning frequency representative of the prism (decentering) parameters and a component at twice the scanning frequency representative of the cylindrical parameters. Measurement of the lens parameters can, of course, also be made on a meridian-by-meridian basis and means other than a photodetector can be utilized to provide an indication of $s_o$.

It should be appreciated, however, that of the terms contributing to the detector to rear principal plane distance, only the detector to support distance $d_d$ is constant for all lenses analyzed by the system. Thus, it is only convenient to normalize for the ray scan radius $r_o$ and detector support distance $d_d$. Equation 2, thus modified, becomes:

$$F_E = s_o/r_o d_d(1 + d_v/d_d + k_b/d_d) = k_n s_o/(1 + \epsilon_1 + \epsilon_2) \tag{3}$$

where $k_n = 1/r_o d_d$;
$\epsilon_1 = d_v/d_d$; and
$\epsilon_2 = K_B/d_d$

Thus, measured deviation "$s_o$" is representative of the effective lens power modified by two error terms, $\epsilon_1$ and $\epsilon_2$, respectively referred to as the "lift error" and "thickness-shape error".

It should be further appreciated that ophthalmic lens parammeters are generally defined in terms of vertex power, rather than effective power. The back vertex power may be expressed:

$$F_B = s_o/(r_o d_d) [1 + d_v/d_d - k_b/d_d(s_o/r_o-1)] \tag{4}$$

Deviation $s_o$ is therefore also indicative of the back vertex power of lens 10 in the instantaneous meridian modified by the lift-error $\epsilon_1$ and shape-thickness error $\epsilon_2$ terms:

$$F_B = k_n s_o/[1 + \epsilon_1 - \epsilon_2 (s_o/r_o - 1)] \tag{5}$$

Lift error term $\epsilon_1$ is generally insignificant, but shape-thickness error term $\epsilon_2$ is often appreciable. Shape-thickness error term $\epsilon_2$ is proportional to the front curvature thickness and material index of lens 10 and is, in effect, a measure of the difference in radial height of the ray entering the front surface of the lens and the height of the refracted ray leaving the back surface of lens 10. Thus, a very thin lens or a lens with a front flat surface would have shape-thickness error approaching zero. Ophthalmic lenses, however, are often up to 10mm in thickness and typically have a curved front surface. In addition, it is often desirable to measure both the front and back powers of the lens. The error term for ophthalmic lenses, however, can generally be estimated from industry standards by measuring the thickness of the lens and assuming an error value corresponding to measured power and thickness. No estimation can be made for non-ophthalmic lenses or for reversed ophthalmic lenses. While such estimates are generally sufficient, it is desirable to eliminate the shape-thickness error and obtain a direct reading of the true vertex power of the lens.

The present invention provides such a direct readout of the vertex power of lens 10 by the insertion of a mask 36 in an intermediate plane parallel to the rear principal plane of lens 10, at a predetermined axial distance from vertex plane 26. Mask 36 operates to admit to detector 30 within a given meridional section only those rays of beam 12 which pass through a locus or aperture 38 in the mask defining a predetermined range at radial distances from the axis. Aperture 38 is of predetermined radial width $W_a$ on a radius $r_a$ such that it is radially encompassed by the locus defined by beam 12 on the plane of mask 36. As will be explained in more detail below, photodetector 30 generates a signal indicative of the radial deviation of the light rays passing through the center of aperture 38 due to refraction by optical system 10. Since the distances between aperture 38 and photodetector 30, and between aperture 38 and the back vertex 26 of the lens 10 are known, as is the radial distance of aperture 38 from the central axis, the back vertex power of lens 10 in the instantaneous meridian can be calculated.

In addition, the shape-thickness error $\epsilon_2$ present in the McDevitt, Jr. et al apparatus is avoided by insertion of mask 36 in accordance with the present invention. As noted above, the shape-thickness error is attributable to the fact that the radial height of a given ray when intersecting vertex plane 26 is unknown and cannot easily be determined since the distance from the rear principal plane to the vertex is also unknown. Aperture 38 provides a fixed reference such that the height of a given ray at a known axial distance from the vertex is predetermined to provide for a determination of vertex power.

With reference to FIG. 2 and attention again directed to a given meridian, lens 10 refracts the ray of light (denoted 60), passing through the center of aperture 38 by an angle $\gamma_a$, such that ray 60 intersects the plane of detector 30 at a point 62. Had light beam 12 not been refracted, i.e., if lens 10 had been absent, the ray passing through the center of aperture 38 would have intersected detector 30 at a point 52.

Aperture 38 should remain within the locus defined by beam 12 on mask 36 regardless of the amount of refraction by lens 10. To this end, it is preferable that the radius $r_a$ of aperture 38 be substantially equal to the incident beam 12 centroid radius $r_o$ and that beam 12 be wide enough in the radial direction to insure that the refracted beam covers aperture 38.

Detector 30 is arranged to generate a signal indicative of the distance $s_a$ between point 52 and the actual intersection point 62. Distance $s_a$ is indicative of the vertex power $F_B$ of lens 10. The tangent of refraction angle $\gamma_a$ is equal to distance $s_a$ over the detector to maks distance $d_d$. By the law of similar triangles, such ratio can be equated to the ratio of the aperture radius $r_a$ to the distance from the mask to focal point 28; expressed mathematically:

$$\tan \gamma_a = s_a/d_d = r_a/(f_b - d_v) \qquad (6)$$

where $s_a$ is the measured deviation of the refracted locus in the plane of detector 30, $f_b$ is the back focal length between vertex 42 and focal point 28 and $d_v$ is the vertex to mask distance. Thus, as expressed mathematically in the following equation, the measured deviation $s_a$, when normalized for aperture radius $r_a$ and detector to mask distance, is a direct indication of the vertex power in that meridian:

$$F_B = 1/f_b = (s_a/r_a d_d)/(1 + d_v s_a/r_a d_d) \qquad (7)$$

As noted above, $d_v$ generally approaches zero and can be ignored. Further, the lift term $(d_v s_a/r_a d_d)$ is equivalent to the lift term in manual vertometers generally used in the art.

Equation 7 fully represents the lens system back vertex power when the lens system is centered and not anamorphic; that is, when the lens system optical properties are identical in all meridians. Such single meridian measurement could be of practical use on an optical bench for determining, for example, the back focal length of negative lenses. In such instance, aperture 38 would be of pinhole form and positioned at the back vertex plane of the lens, centered in light beam 12. The lens may be offset (in parallel) from the centered position by a known amount.

To provide measurement of the refractive properties of an anamorphic lens system such as a sphero-cylindrical lens, a measurement of the refractive properties must be made in a multiplicity of meridians. To accomplish such a measurement, an effective rotational scanning of the lens system is utilized. The instantaneous deviation $s_a$ measured in a sampled meridional section during the course of the effective scan is, when normalized as above, representative of the sphero-cylindrical lens back vertex power in that meridional section. Thus, the average value of, and the difference between, the readings in opposite meridians respectively provide the true back vertex power in those meridians for a decentered lens, and the prismatic value of the lens in those meridians. The average of all the meridional readings represents the mean back vertex sphere power of the sphero-cylindrical lens.

The effective scanning can be accomplished in various manners. The lens system can be rotated with respect to a stationary light beam 12 and aperture 38, by means incorporated into support cone 44. Such a method may be desirable on an optical bench. However, a circular scanning of collimated light beam 12 parallel to the rotational axis is preferred. As mentioned above, such scanning provides for ready indication of the lens centering (prism) parameters, as well as the average spherical and the cylindrical parameters of the lens system. A pinhole aperture may be rotated in synchronism with beam 12 behind lens system 10 by means incorporated into support cone 44. However, the mechanism for rotating the aperture can be complex and impractical in various applications. A preferred alternative to a rotating pinhole aperture is a stationary back vertex aperture in the form of a circular annulus of constant radius $r_a$ and radial width $W_a$. The annular aperture is disposed on the top of support cone 44 and centered on the rotational scanning axis.

Where an annular aperture is used, beam 12 should be wide enough in the radial direction to radially encompass the illuminated portion of annulus 38. However, beam 12 should also be as narrow as possible in the tangential direction, to provide a ring-sector projection on detector 30 of a relatively short arc length. A tangentially narrow, radially wide scanning beam can be provided by centering a slot on the rotating scanner or by other means well known in the art.

The arc length of the ring-sector projection from annulus 38 can be important where detector 30 is of the type which effectively measures the centroid of the illuminating projection. It should be appreciated that the radial and tangential dimensions of beam 12 at detector 30 are magnified from the corresponding dimensions in the plane of annulus 38 by a factor M where:

$$M = W_d/W_a = (s_a/r_a - 1) \approx (d_d F_B - 1) \qquad (8)$$

Where the tangential arc length of the projection on detector 30 is large with respect to its radial width, slight compensation should be made for ring-sector projection centroidal effects.

Annulus radius $r_a$ is chosen in accordance with the variety of lenses to be analyzed by the apparatus. For example, an annulus with a radius of 2 millimeters and width of 0.2 millimeters will accommodate optical systems as small as contact lenses. In order to insure that such an annulus remains within the locus of the refracted beam over a wide range of lens powers and decentering, a beam width of 1.6 millimeters or greater is desirable. Standard lasers provide beams with widths between 0.5 and 0.8 millimeters and, therefore, use of a beam expander may be necessitated. Means 14 (FIG. 1) for providing beam 12, therefore, suitably comprises a conventional beam expander 18 interposed between a conventional light source 16 and beam scanner 20 of the type described in the aforementioned U.S. Pat. No. 4,007,990 to McDevitt, Jr. et al.

Figure 3:
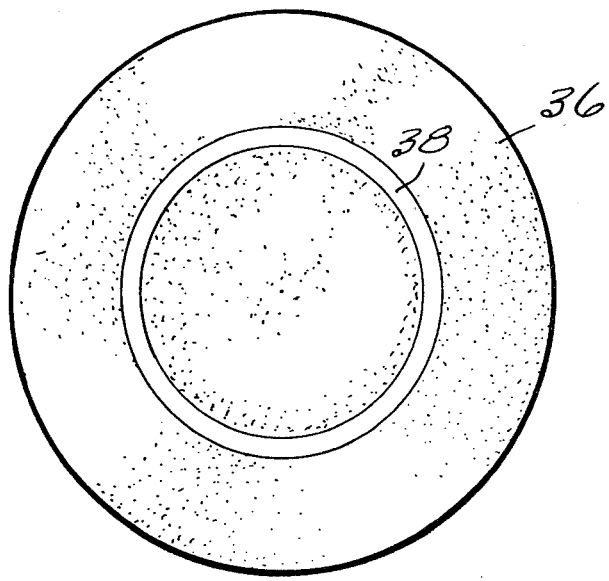
FIGS. 3, 4 and 5 are planar views of various masks in accordance with the present invention.
Figure 4:
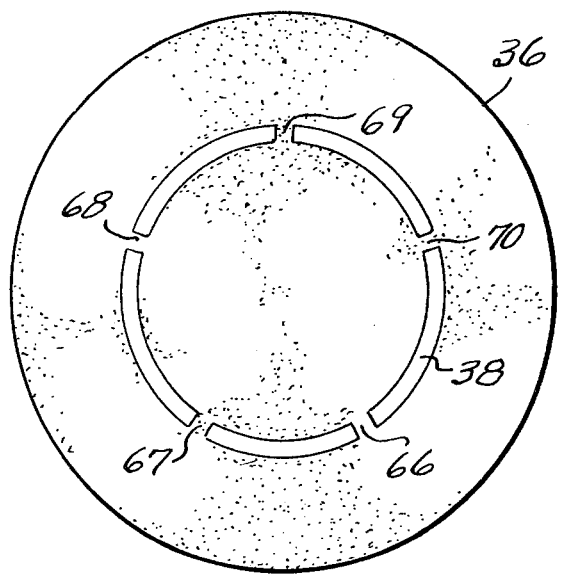
Figure 5:
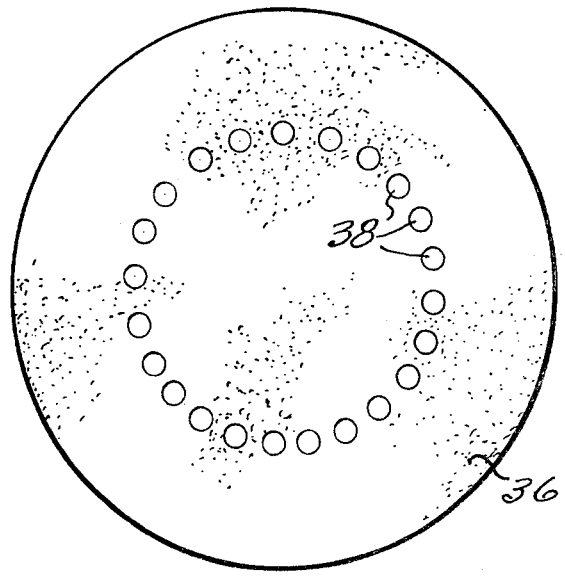

Various embodiments of mask 36 are illustrated in FIGS. 3–6. Mask 36 can be an integral part of lens support cone 44 or it can be a separate insert. For example, as illustrated in FIG. 3, mask 36 can be formed from a glass sheet having applied an opaque material to all portions thereof expect annulus 38. As noted above, annulus 38 suitably has a diameter of 4 millimeters and aperture width of 0.2 millimeters.

Further embodiments of mask 36 formed of metal are described in the aforementioned copending application, Ser. No. 782,297, now U.S. Pat. No. 4,102,575, "Back Vertex Annular Aperture" filed on or about even date herewith by E. F. Lapornik and D. D. Rife.

Although only a preferred embodiment of the present invention is described herein, it is not intended that the invention be restricted thereto but rather be defined by the appended claims.

What is claimed:

1. An apparatus for measuring a vertex power of a lens system having a central axis, an effective principal plane, a vertex and a focal point, comprising in combination:

means for providing a beam of parallel light rays, said beam being parallel to said central axis at a first predetermined radial distance therefrom, said beam of light impinging on said lens system, said light beam being refracted by said lens system such that said light beam virtually defines a first locus on said principal plane, and effectively passes thererfrom in a straight line through said focal point to tend to define a second locus on an intermediate plane parallel to said principal plane at a first predetermined axial distance along said central axis from said vertex, and illuminating a portion of a subsequent plane parallel to said principal plane positioned a second predetermined axial distance along said central axis from said intermediate plane;

means for effecting a rotational motion between said light beam and said lens system about a rotational axis at a predetermined angular frequency;

means for admitting to said subsequent plane only such portion of said light beam as passes through a third locus within said second locus on said intermediate plane, said third locus being annular and of lesser radial dimension than said second locus, and disposed at a second predetermined radial distance from said central axis, the portions of said light beam as refracted admitted to said subsequent plane defining a fourth locus on said subsequent plane and the portions of said light beam when unrefracted tending to be admitted to said subsequent plane, tending to define a fifth locus on said subsequent plane; and means responsive to said light beam portions passing through said third locus for providing an indication of the difference in radial position in said subsequent plane of said fourth locus from said fifth locus, whereby said indication is representative of the vertex power of said optical system.

2. The apparatus of claim 1 wherein said indication means comprises a position-sensitive photodetector disposed in said subsequent plane, said photodetector generating an output signal indicative of said radial position difference.

3. The apparatus of claim 2 wherein said output signal is representative of:

$$r_a d_a (F_B / 1 - d_v F_B)$$

where $F_B$ is the vertex power of said optical system, $r_a$ is said predetermined radial distance between said fourth locus and central axis, $d_v$ is said predetermined axial distance between said vertex plane and said intermediate plane, and $d_a$ is said predetermined distance between said intermediate plane and said subsequent plane.

4. The apparatus of claim 1 wherein said indication means comprises means for providing visual indication of said radial position difference.

5. In an apparatus for measuring the vertex power of an optical system having a vertex and a focal point, said apparatus being of the type including means for providing a beam of parallel light rays, said beam being at a predetermined radial distance from and parallel to a predetermined central axis to impinge upon said optical system and is scanned about said central axis, said optical system refracting said light beam such that said light beam effectively passes through said focal point, and tends to define a locus on an intermediate plane and to illuminate a portion of a subsequent plane, said intermediate and subsequent planes being at respective predetermined axial distances from said vertex, and means for providing an indication of radial positional deviations of said light beam in said subsequent plane due to refraction by said optical system, and indication being representative of said refractive properties, the improvement wherein said apparatus further comprises:

means for defining an aperture within said locus in said intermediate plane, said aperture being of lesser radial dimension than said second locus and of predetermined radial distance from said central axis, and for admitting to said subsequent plane only such of said refracted light beam as passes through said aperture whereby said radial positional deviation is indicative of the vertex power of said optical system;

said means for defining an aperture comprising a generally opaque mask having a transparent annulus to define said aperture, said mask being disposed in said intermediate plane.

6. The apparatus of claim 5 wherein said indication means provides an output signal representative of:

$$r_a d_a F_B / (1 - d_v F_B)$$

where $F_B$ is the vertex power of said optical system, $r_a$ is said predetermined radial distance of said second locus from said central axis, $d_a$ is the axial distance between said intermediate and subsequent planes, and $d_v$ is said axial distance between said vertex and said intermediate plane.

7. In an apparatus for measuring refractive properties of a lens system having a vertex and optical axis, said apparatus being of the type including a light source for providing a collimated light beam, means for positioning said optical system in the path of said light beam such that said light beam is parallel to said optical axis and in a given meridian of said lens system, to produce a refracted light beam, said refracted light beam tending to illuminate a portion of a subsequent plane normal to said optical axis, and means responsive to the radial position of said refracted light beam in said subsequent plane for generating an indicating of said refractive properties in said given meridian, the improvement wherein:

said apparatus comprises means for effectively scanning said light beam about an axis parallel to said optical axis and means for rotating said aperture in synchronism with said light beam, said aperture being of pinhole form; and said refracted light beam describes a locus in an intermediate plane between said lens system and said subsequent plane at a predetermined axial distance from said optical system vertex; and said apparatus further comprises means for admitting to said subsequent plane only such portions of said refracted light beam as pass through a predefined aperture in said intermediate plane, said aperture being within said locus at a predetermined radial distance from said axis and of predetermined radial dimension less than the radial dimension of said locus;

said indication being representative of the difference between the instantaneous radial position in said subsequent plane of said refracted light beam portion and said aperture predetermined radial distance and thereby indicative of the vertex power of said lens system in said given meridian.

8. Apparatus for measuring refractive properties of a sphero-cylindrical optical system having a vertex comprising:

means for producing a collimated light beam of predetermined radial beam width;

means for effecting a circular scanning of said light beam parallel to a predetermined rotational axis at a predetermined scanning radius to illuminate said optical system and produce a scanned refracted beam;

a generally opaque mask disposed at a predetermined axial position from said vertex, said mask including a transparent annulus portion of predetermined radius and radial width, said transparent annulus being disposed in the path of said refracted light beam, said annulus radial width being less than said predetermined radial beam width;

photodetector means positioned at a predetermined axial distance from said mask for generating an output signal indicative of change in radial distance of the instantaneous point of intersection of said light beam with said photodetector due to refraction by said optical system from said predetermined radius; and signal processing means responsive to said photodetector output signals for generating signals indicative of said refractive properties.

9. The apparatus of claim 8 wherein said annulus radius is substantially equal to said scanning radius.

10. In an apparatus for measuring refractive properties of a lens system having a vertex and optical axis, said apparatus being of the type including a light source for providing a collimated light beam, means for positioning said optical system in the path of said light beam such that said light beam is parallel to said optical axis and in a given meridian of said lens system to produce a refracted light beam, the apparatus comprising means for effectively scanning said light beam about an axis parallel to said optical axis, said refracted light beam tending to illuminate a portion of a subsequent plane normal to said optical axis, and means responsive to the radial position of said rafracted light beam in said subsequent plane for generating an indication of said refractive properties in said given meridian, the improvement wherein:

said refracted light beam describes a locus in an intermediate plane between said lens system and said subsequent plane at a predetermined axial distance from said optical system vertex, and said apparatus further comprises means for admitting to said subsequent plane only such portions of said refracted light beam as pass through a predefined aperture in said intermediate plane, said aperture being within said locus at a predetermined radial distance from said axis and of predetermined radial dimension less than the radial dimension of said locus;

said aperture being in the form of a circular annulus of constant radius and radial width and centered on said rotational axis; and said indication being representative of the difference between the instantaneous radial position in said subsequent plane of said refracted light beam portion and said aperture predetermined radial distance and thereby indicative of the vertex power of said lens system in said given meridian.

11. The apparatus of claim 10 wherein said indication means provides an output signal substantially equal to:

$$r_a d_a F_B/(1 - d_v F_B)$$

where $F_B$ is the vertex power of said optical system, $r_a$ is said fourth locus predetermined radial distance, $d_a$ is the distance between said intermediate and subsequent planes and $d_v$ is said predetermined distance between said intermediate plane and said optical system vertex.

* * * * *